(12) United States Patent
Greegor et al.

(10) Patent No.: US 7,928,892 B2
(45) Date of Patent: Apr. 19, 2011

(54) IDENTIFICATION AND MAPPING OF UNDERGROUND FACILITIES

(75) Inventors: Robert B. Greegor, Auburn, WA (US); Claudio G. Parazzoli, Seattle, WA (US); Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 12/116,540

(22) Filed: May 7, 2008

(65) Prior Publication Data
US 2009/0278725 A1    Nov. 12, 2009

(51) Int. Cl.
*G01S 13/00* (2006.01)
(52) U.S. Cl. .......................... 342/22; 324/330
(58) Field of Classification Search .............. 342/22
See application file for complete search history.

(56) References Cited

U.S. PATENT DOCUMENTS

| | | | |
|---|---|---|---|
| 3,286,163 A * | 11/1966 | Holser et al. ................. | 324/338 |
| 6,329,955 B1 | 12/2001 | McLean et al. | |
| 6,437,750 B1 | 8/2002 | Grimes et al. | |
| 6,657,577 B1 * | 12/2003 | Gregersen et al. ............. | 342/22 |
| 6,750,820 B2 | 6/2004 | Killen et al. | |
| 6,847,328 B1 | 1/2005 | Libonati et al. | |
| 6,958,729 B1 | 10/2005 | Metz | |
| 7,068,225 B2 * | 6/2006 | Schantz ................. | 343/700 MS |
| 7,218,285 B2 | 5/2007 | Davis et al. | |
| 7,265,730 B2 | 9/2007 | Iizuka et al. | |
| 2004/0118313 A1 * | 6/2004 | Temes et al. ................. | 102/498 |
| 2005/0156600 A1 * | 7/2005 | Olsson et al. ................. | 324/329 |
| 2006/0028385 A1 | 2/2006 | Davis et al. | |
| 2007/0035304 A1 * | 2/2007 | Stolarczyk et al. ........... | 324/330 |
| 2007/0109177 A1 * | 5/2007 | Baath et al. ................. | 342/124 |
| 2008/0018525 A1 * | 1/2008 | Svy et al. ................. | 342/169 |
| 2009/0135086 A1 * | 5/2009 | Fuller et al. ................. | 343/909 |

OTHER PUBLICATIONS

Richard W. Ziolkowksi and Allison D. Kipple, "Reciprocity between the effects of resonant scattering and enhanced radiated power by electrically small antennas in the presence of nested metamaterial shells", Physical Review, The American Physical Society, 2005, pp. 036602-1 to 036602-5, Department of Electrical and Computer Engineering, The University of Arizona, Tucson, Arizona.

Jeffrey J. Daniels, "Ground Penetrating Radar Fundamentals", Appendix to a report to the U.S.EPA, Region V, Nov. 25, 2000, pp. 1-21, Department of Geological Sciences, The Ohio State University, Ohio.

* cited by examiner

*Primary Examiner* — Thomas H Tarcza
*Assistant Examiner* — Timothy A Brainard
(74) *Attorney, Agent, or Firm* — McNees Wallace & Nurick LLC

(57) ABSTRACT

A system or method of creating a map of voids in the ground based on a scattered electromagnetic signal includes traversing a receiver/probe in a near field above a target area; generating a signal from a signal transmitter, the signal having a predetermined wavelength λ; receiving a scattered signal with the receiver/probe, the scattered signal including indications of subsurface variations via reflection of the generated signal; and detecting evanescent components of the scattered signal to provide a predetermined resolution. The method includes the use of an electrically small antenna for resolution of subwavelength features. The metamaterial-based antenna is on the order of meters and has an efficient transmit/receive capability. The ESA is ¹⁄₁₀ of the length of the equivalent dipole length, and may be scaled down to ¹⁄₁₀,₀₀₀. Such an antenna may include phase sensitive current injection in the metamaterial resonant structures for loss-compensation.

22 Claims, 6 Drawing Sheets

IDENTIFICATION AND MAPPING OF UNDERGROUND FACILITIES

BACKGROUND

The application generally relates to a method and system for the identification and mapping of subsurface facilities. The application relates more specifically to resolution of sub-wavelength features of underground facilities using metamaterial resonant structures in antennae.

One object of gathering intelligence data is the identification, mapping, and location of deeply buried underground facilities. The scientific community is interested in methods for locating and mapping underground facilities in non-accessible territory to determine, for example, whether underground nuclear facilities are situated in underground bunkers. A key factor that makes it difficult to detect, locate or map such underground facilities is that conventional radar does not penetrate the Earth's surface. When using conventional radar the electromagnetic waves are reflected and attenuated by the soil, due to the finite conductivity and dielectric loss of the soil.

Typical ground penetrating radar (GPR) may operate in the frequency range of 100-400 MHz, but in that frequency range, the radar can penetrate the Earth's surface to a depth of only about one meter. In order for radar waves to penetrate deeper into the ground, a radar signal with a lower frequency, e.g., in the range of 10-150 kHz, is required. At frequencies as low as 10-150 kHz, the electromagnetic radar wave can penetrate the Earth to a depth as great as 100 meters or more, depending on the soil characteristics. However, since radar antennas are geometrically proportional to the wavelength, operating a radar system at frequencies as low as 10-150 kHz normally requires an enormous antenna. The corresponding wavelengths of 10-150 kHz radiowaves range from 30 km to 3 km. Such an antenna cannot be carried efficiently by an airplane, and in any event may not radiate sufficient power to generate a ground-penetrating radar wave. Further, the resolution of such a low frequency radar system would have limited diffraction properties. Such a radar system would be diffraction limited and able to resolve only those objects or features of sizes comparable to the wavelength. Such relatively large objects or features are much larger than most of the features that are being sought.

These existing GPRs are based on transmitting a very short pulse which includes all of the long wavelength Fourier components and can thus penetrate the ground to some extent. However, such GPRs at best penetrate the ground within about a meter of the Earth's surface. Such GPRs are typically used to locate wires, pipes etc. under the ground within about a meter of the top surface. None of the short pulse GPRs can penetrate to a subsurface depth of about 100 meters, which is the range of depth illumination that is required for detecting strategic underground facilities.

Existing methods for identification and mapping of underground facilities include satellite imagery that can indicate construction or excavation activities on the Earth's surface. Satellite imagery provides an approximate or general location of such a facility. However, many underground facilities are accessible by a rather long tunnel that leads from the excavation point to the final underground destination point, meaning that identifying the entrance point at the surface may provide an inaccurate indication of the location of the underground facility. Depending on the length of the access tunnel, the area to be mapped underground could cover a rather large physical area, on the order of many square kilometers.

Other suggested methods to identify underground facilities require placement of acoustic sensors in the ground to detect activity associated with such underground facilities. Small sensors placed in the vicinity of such a structure may pick up acoustic signatures for identifying the exact location of the facility. However, it is not always possible to place sensors, conceal them from discovery, and then periodically interrogate such sensors in the vicinity of such an underground facility. The underground facilities of interest are often located in restricted areas, e.g., facilities located on foreign territory. Furthermore, it would be necessary to have determined, in advance, at least a general location of such an underground facility. Unless the ground sensors are placed in the exact location where detection of signals is likely, it would be easy to miss detection of the target. Finally, the logistics and cost of placing a large number of sensors make placing acoustic sensors an impractical and unattractive solution.

Electrically small antennas (ESA) are known, such as an electrically small, low "Q" radiator as disclosed in U.S. Pat. No. 6,437,750.

Other features and advantages will be made apparent from the present specification. The teachings disclosed extend to those embodiments that fall within the scope of the claims, regardless of whether they accomplish one or more of the aforementioned needs.

SUMMARY

One embodiment relates to a method of creating a map of voids in the ground based on a scattered electromagnetic signal. The method includes traversing a receiver/probe in a near field above a target area; generating a signal from a signal transmitter, the signal having a predetermined wavelength $\lambda$; receiving a scattered signal with the receiver/probe, the scattered signal including indications of subsurface variations via reflection of the generated signal; and detecting components of the scattered signal to provide a predetermined resolution.

Another embodiment relates to a method of creating a map of voids in the ground based on a scattered electromagnetic signal. The method includes traversing in an aircraft having a receiver/probe and signal transmitter, a near field above a target area; generating a signal from a signal transmitter, the signal having a predetermined wavelength $\lambda$; receiving a scattered signal with the receiver/probe, the scattered signal including indications of subsurface variations via reflection of the generated signal; and detecting components of the scattered signal to provide a predetermined resolution.

Certain advantages of the embodiments described herein include the capability to resolve very small objects compared to the wavelength of an interrogation signal.

Another advantage is the ability to operate the transmitter in the very near field relative to the signal source and the object.

A further advantage is the ability to obtain super-resolution on the order of about $\lambda/100$.

Alternative exemplary embodiments relate to other features and combinations of features as may be generally recited in the claims.

DETAILED DESCRIPTION OF THE EXEMPLARY EMBODIMENTS

The method includes the use of a specially designed electrically small antenna (ESA) to provide resolution of subwavelength features. Subwavelength features are features that are smaller than the illuminating or probing wavelength. In one embodiment, the ESA is transported on an aircraft. The ESA is on the order of meters and has an efficient transmit/receive capability compared to a regular dipole. The ESA is constructed using metamaterial concepts. The metamaterial may be single negative (SNG) (i.e. the permittivity $\epsilon'<0$, or the permeability $\mu'<0$) or double negative (DNG) (i.e. both the permittivity $\epsilon'<0$ and the permeability $\mu'<0$). An ESA is $\frac{1}{10}$ of the length of the equivalent dipole length, and may be scaled down to $\frac{1}{1000}$ or $\frac{1}{10,000}$. Such an antenna may include phase sensitive current injection in the metamaterial resonant structures for loss-compensation.

The near field of an antenna is the region of an antenna where the angular field distribution is dependent upon the distance from the antenna, or that part of the radiated field that is within a small number of wavelengths of the diffracting edge or antenna. The diffraction pattern in the near field typically differs significantly from that observed at infinity and varies with distance from the source. The far-field refers to the region outside the near-field region, where the angular field distribution is essentially independent of distance from the source. If the source has a maximum overall dimension D that is large compared to the wavelength, the far-field region is generally a distance greater than $D^2/\lambda$ from the source, where $\lambda$ is the wavelength. In any kind of electromagnetic detection using radar, or a reflected signal, a reflection occurs in the far field of the receiver. The basic diffraction formula indicates that one can only discern features with a resolution approaching that of the wavelength used for the scattering process. However, by using a small probe that can come very close to the scatterer, or specimen surface, it is possible to obtain subwavelength resolution. Assuming that the detector is infinitesimal, the resolution is determined by the proximity of the sensor to the scatterer, the resolution being comparable in magnitude to the distance from the scatterer.

The ESA as described herein provides a means to create a map of voids in the ground based on a scattered signal. If a probe is very close to the scatterer, then evanescent components of the scattered signal can be detected, especially those with very high wave vectors, which will provide the hyperresolution desired. The evanescent components are quickly attenuated as one moves away from the scatterer and essentially disappear when you are about one wavelength away. So, if a resolution of $\frac{1}{1000}$ is required, then the probe would have to be a comparable distance from the scatterer.

Figure 1:
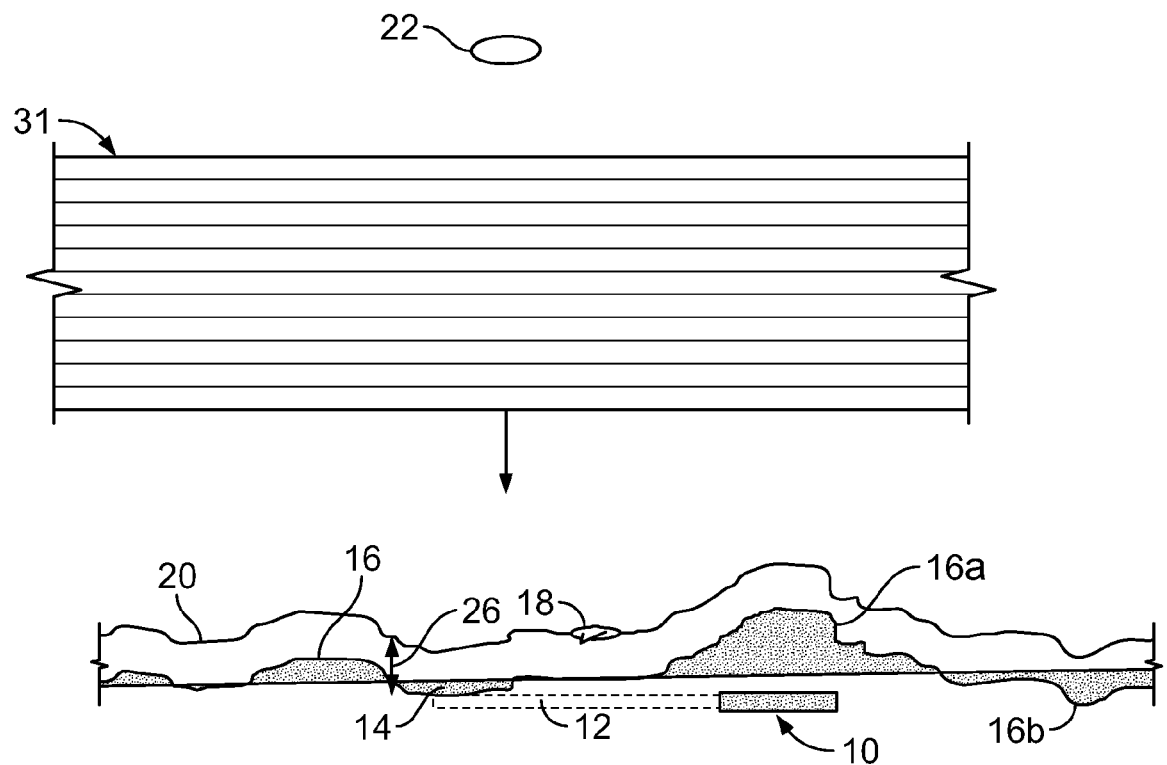
FIG. 1 is an exemplary embodiment of the method employing substantially plane wave illumination with a transmitter source in the far field and a receiver/probe in the very near field.

Referring first to FIG. 1, an exemplary underground facility 10 is characterized by equation 1:

$$\lambda/N; \text{ wherein } N>>1 \qquad \text{[Equation 1]}$$

That is, the characteristic dimension, i.e., size or depth of the underground facility may be defined in terms of a wavelength $\lambda$ divided by a large integer number N, much greater than 1. A tunnel 12 connects the underground facility with a remote surface access point 14. The Earth's surface 16 is shown as an irregular or uneven surface, having a plurality of hills 16a and valleys 16b, as such features may naturally occur. A receiver/probe 18 travels along a flight path 20 at a low altitude, for example, thirty to fifty meters (m), although the flight path may be at higher or lower altitudes than this, e.g., ten meters or a kilometer, depending on the depth of the image that is to be illuminated by the transmitted signal. Flight path 20 preferably follows a profile of the Earth's surface which corresponds to the surface irregularities present in the terrain. In this embodiment, the source or transmitter 22 is placed in the far field, and the probe/receiver 18 is placed in the "very" near field. The probe/receiver 18 would have to fly at very low altitude, typically in a range of thirty meters to fifty meters, although depending on the application, higher or lower altitudes may be applicable.

In the embodiment shown in FIG. 1, it is assumed that the transmitter 22 is a faraway object i.e., a satellite located in the far field, such that the incident wave 31 generated from the transmitter 22 is substantially a plane wave. In an exemplary embodiment, the satellite may be disposed in a low earth orbit. A plane wave provides a contrast ratio which is greater than the contrast ratio of a dipole illuminator. However, as indicated below with respect to FIG. 2, a dipole illuminator configuration may also be used effectively in the appropriate application.

If a transmitter 22 is mounted on a faraway object or satellite, and used as the illuminator, the transmitter 22 could employ an electrically-small antenna (ESA) (See, e.g., FIGS. 3 & 4 for exemplary ESA simulations), or alternately, pull along a very long antenna wire or conductor, the length of the wire being in the range of ½ or ¼ of the desired wavelength $\lambda$. If $\lambda$ is in the range of 1 to 10 kilometers (km), the length of the antenna wire might be unmanageable. Normally, a high-flying aircraft 24 flying at an altitude of approximately 100,000 feet would be too near the Earth's surface to carry the transmitter 22.

Figure 2:
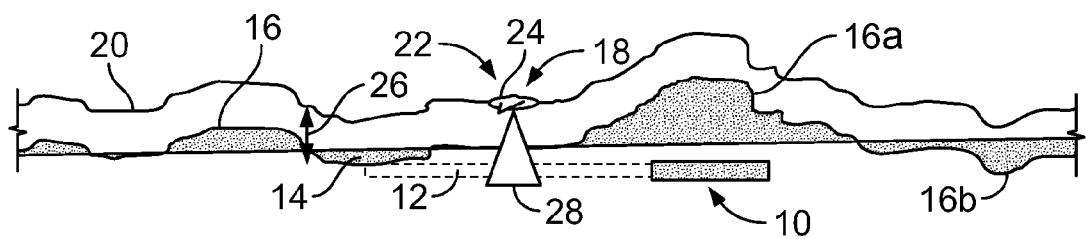
FIG. 2 is an exemplary embodiment of the method employing illumination with the transmitter source and the receiver/probe in the very near field.

Referring to FIG. 2, another embodiment is shown, wherein the aircraft 24 carries both the transmitter 22 and the receiver/probe 18, as the aircraft 24 traverses the flight path 20. The flight path 20 has a profile that approximates the profile of Earth's surface 16 in the region of interest. The signal to noise ratio is not as great, thus the contrast improvement is lower than the arrangement shown in FIG. 1, however, the arrangement shown in FIG. 2 provides is more advantageous with respect to the amount of power required to achieve illumination of the subterranean features. The power required to achieve illumination of the subterranean features is inversely proportional to the square of the distance between the receiver and the reflected surface of the subterranean feature.

In FIG. 2, the source transmitter 22 and the receiver/probe 18 are in the very near field, i.e., the altitude of the flight path 20 is approximately $\lambda/N$, as indicated by arrow 26. The interrogation signal 28 is shown in FIG. 2 as a conical beam rather than a plane wave, due to the fact that the transmitter 22 is located in the very near field. The capability to resolve very small objects compared to the wavelength of interrogation is a function of the fact that the transmitter 22 generates the interrogation signal in the very near field of the source and the object.

Figure 3:
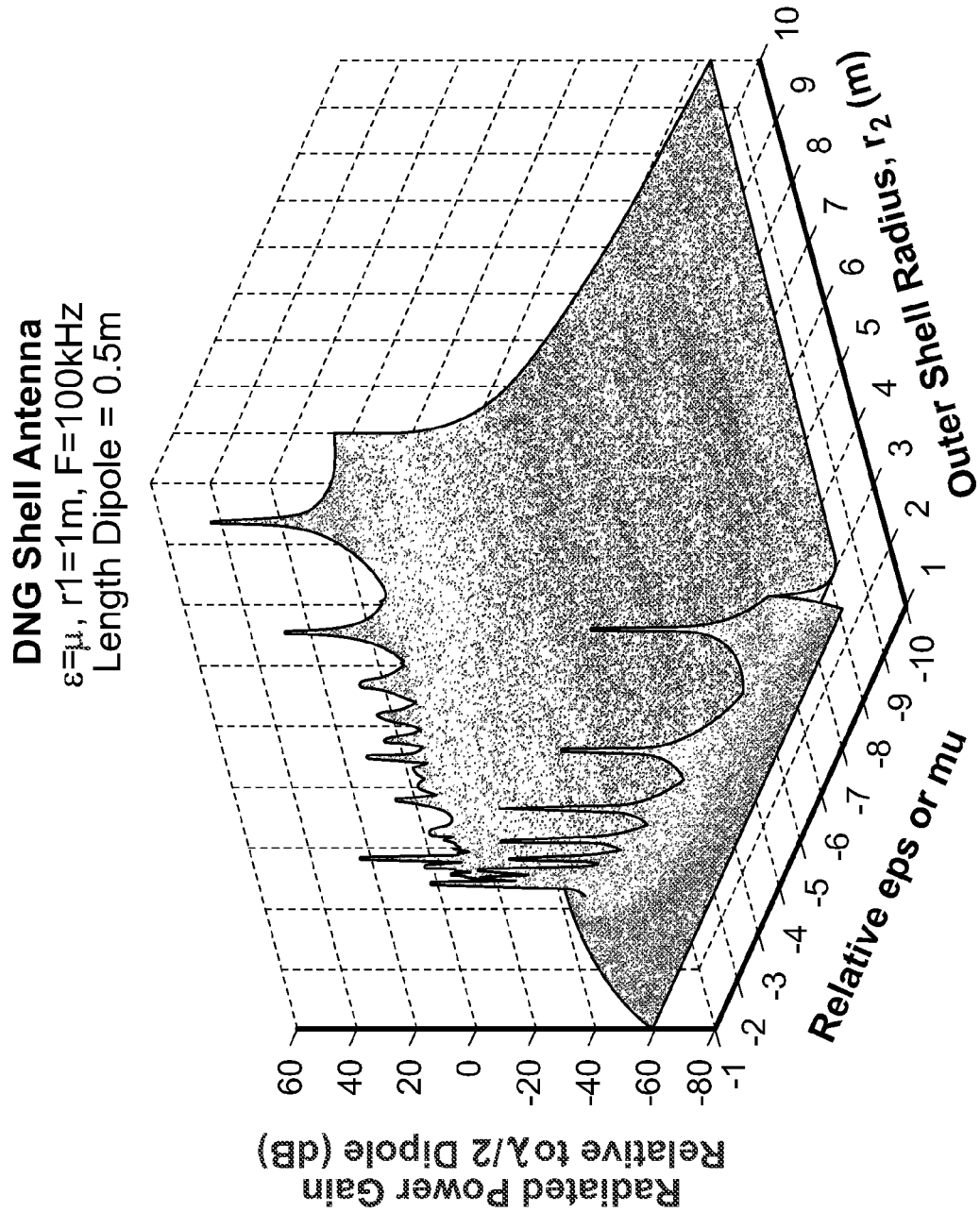
FIG. 3 is a double negative (DNG) shell antenna simulation for a 0.5 m electric dipole response to a 100 kHz signal that demonstrates an embodiment of an ESA in the frequency range of interest.
Figure 4:
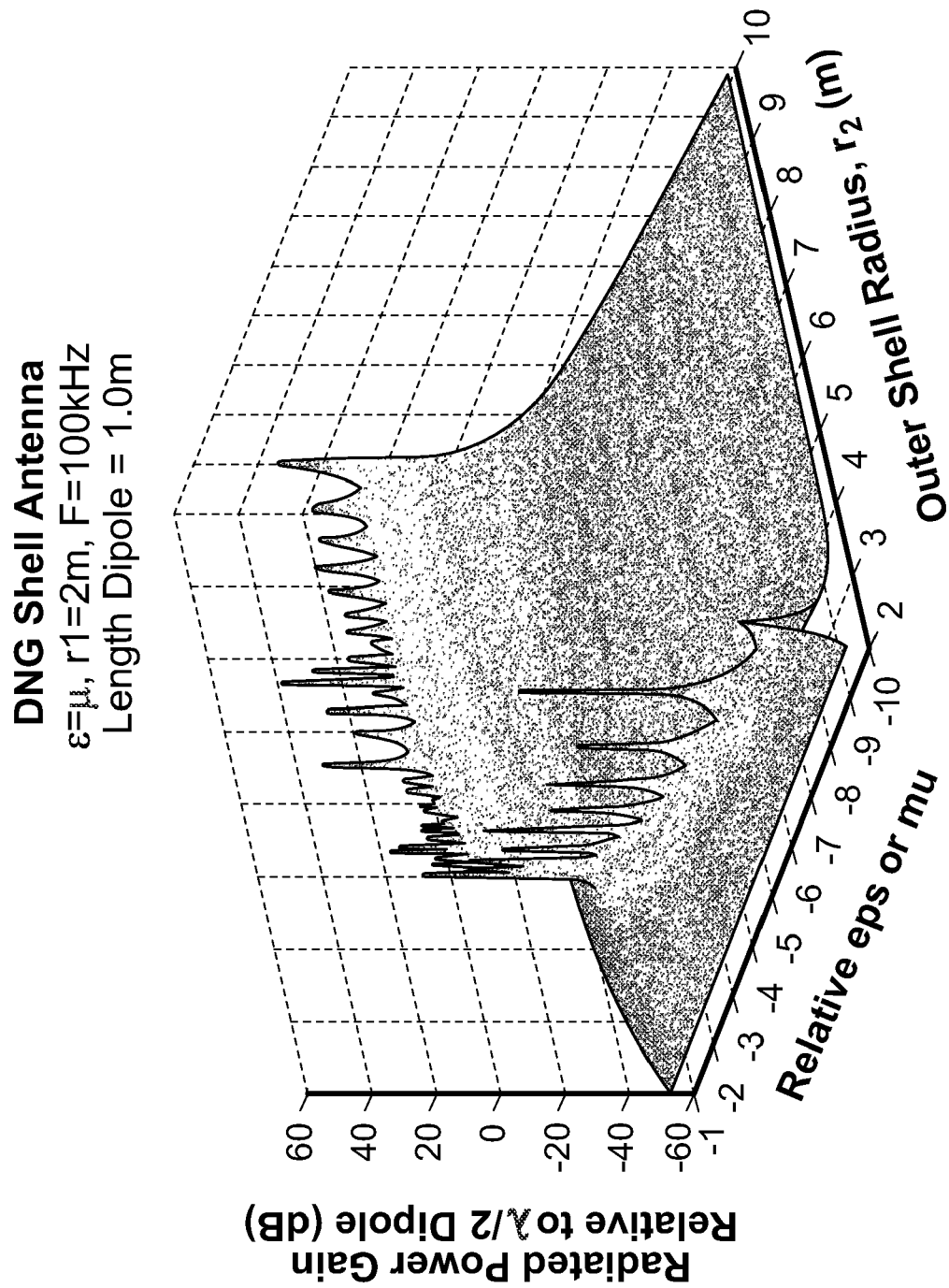
FIG. 4 is a double negative (DNG) shell antenna simulation for a 1.0 m electric dipole response to a 100 kHz signal that demonstrates an embodiment of an ESA in the frequency range of interest.

FIGS. 3 and 4 show simulations for a 0.5 m and 1.0 m electric dipole, respectively, in a spherical shell constructed of double negative (DNG, both the shell permittivity $\epsilon$ and the shell permeability $\mu$ are negative) or negative index of refraction (NIM) material. For inner radii r1 and outer radii r2 on the order of a few meters this electrically small antenna (ESA) has a gain with respect to a 100 kHz, $\lambda/2$ dipole (1.5 km) antenna. This exemplary ESA is sufficient for application in mapping underground facilities, assuming proper choices of $\epsilon$ and $\mu$, which are based on, for example, properties of the physical dimensions of the antenna, the capacitance and inductance of the design, discrete elements, and construction materials. Proper choices of the shell material are those values of $\epsilon$ and $\mu$ that result in a radiated power level that is comparable to or better than the power level of a large half-wavelength dipole ($\lambda/2$).

Figure 5:
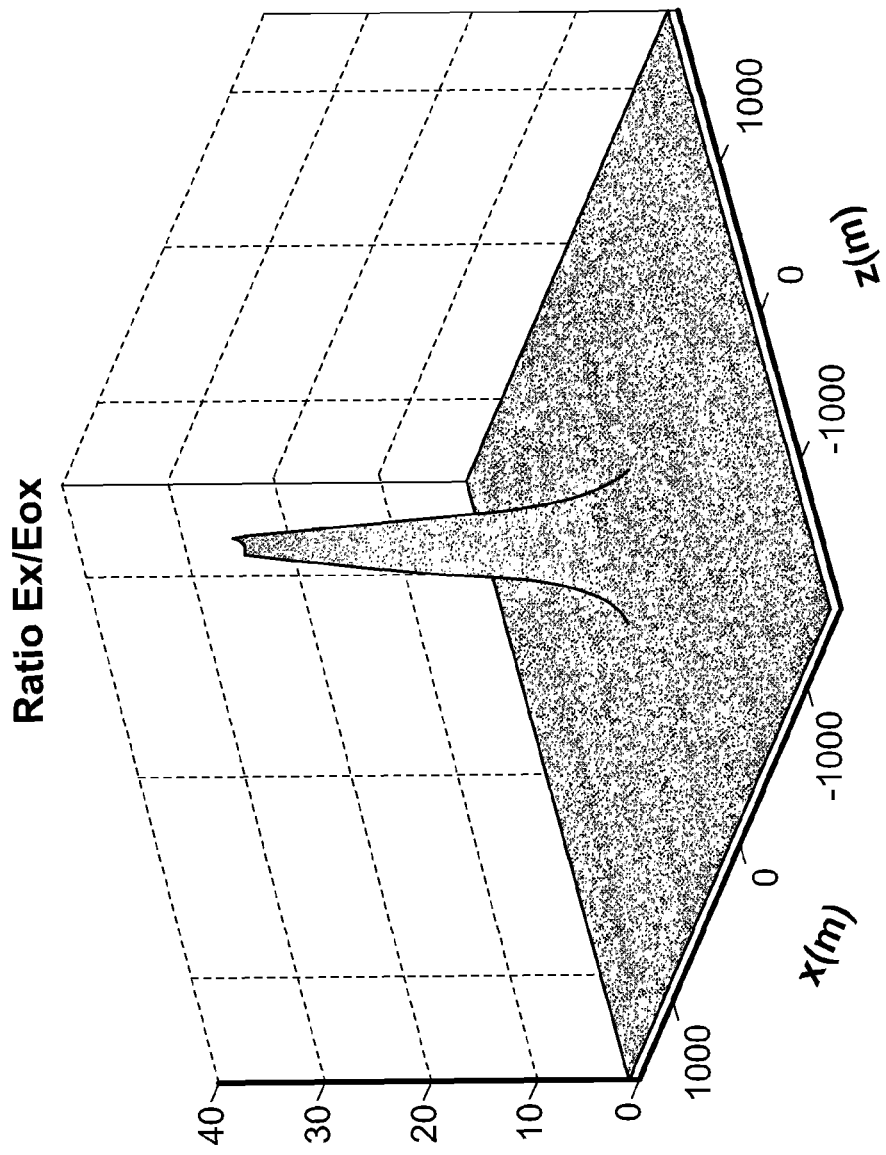
FIGS. 5 and 6 illustrate response properties of the electrically small antenna (ESA) for mapping and detecting cavities 100 meters below the surface.
Figure 6:
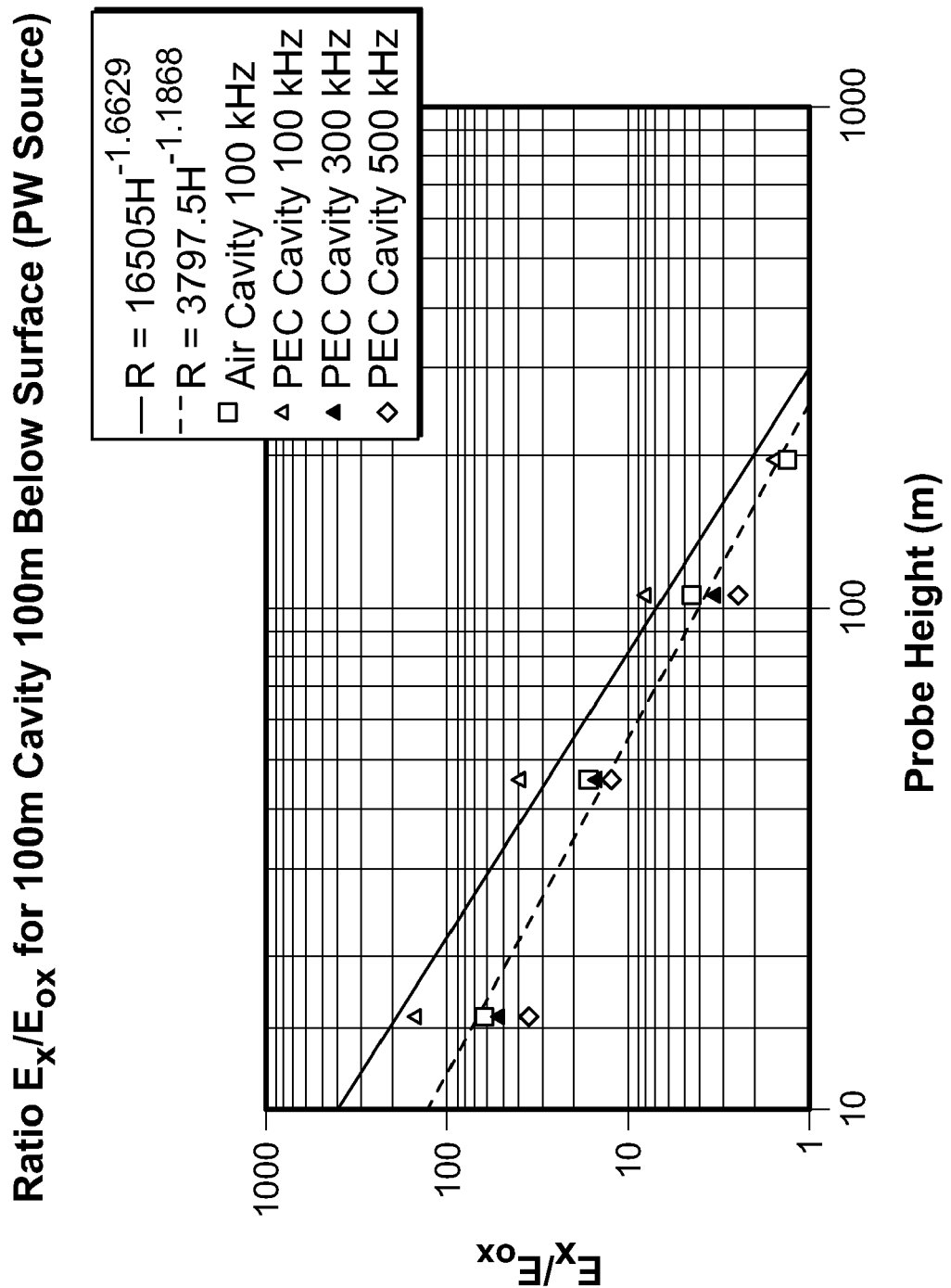

FIGS. 5 and 6 illustrates that the ESA can be used to map the location of a 100 m cavity 100 meters below the surface. In FIG. 6, the ratio of electric field is shown with the cavity present ($E_x$) and without the cavity present ($E_{ox}$). As indicated in FIG. 6, the ratio of the reflected or scattered signal decays with the probe height, and is difficult to detect above 200 m. This is true for both an air cavity and for a perfect electrical conductor (PEC) (e.g., metal) cavity. Also, as can be seen in FIG. 6, higher frequencies do not penetrate the ground (assuming earth $\epsilon=4.0$, $\mu=1.0$, $\sigma=1e-4$ S/m) as well as the 100 kHz signal. The map that is generated in the near field is 2D and shows the location of the cavity. The map is generated by flying the probe in the near field collecting data over rectilinear grid points.

The 100 kHz signal can penetrate the ionosphere if the transmitter is in low earth orbit, e.g., 200 km. At this altitude the electron density is n~1e4/cm³. The frequency for transmission through the ionosphere is given by F=9e-4 (n)1/2=9e-2 MHz or ~90 kHz. The critical frequency is angle dependent Fc=F/sin α, where α is the angle with respect to the horizon. Since for our application α=90 degrees, the critical frequency is ~90 kHz. Below this frequency some transmission will occur but will not be passed as well as higher frequencies. Commonly owned U.S. patent application Ser. No. 12/116556, entitled "Electrically Small Antenna", filed concurrently with the present patent application, discloses an exemplary ESA suitable for use in the method and systems disclosed herein, and the same is hereby incorporated by reference in its entirety.

Figure 7:
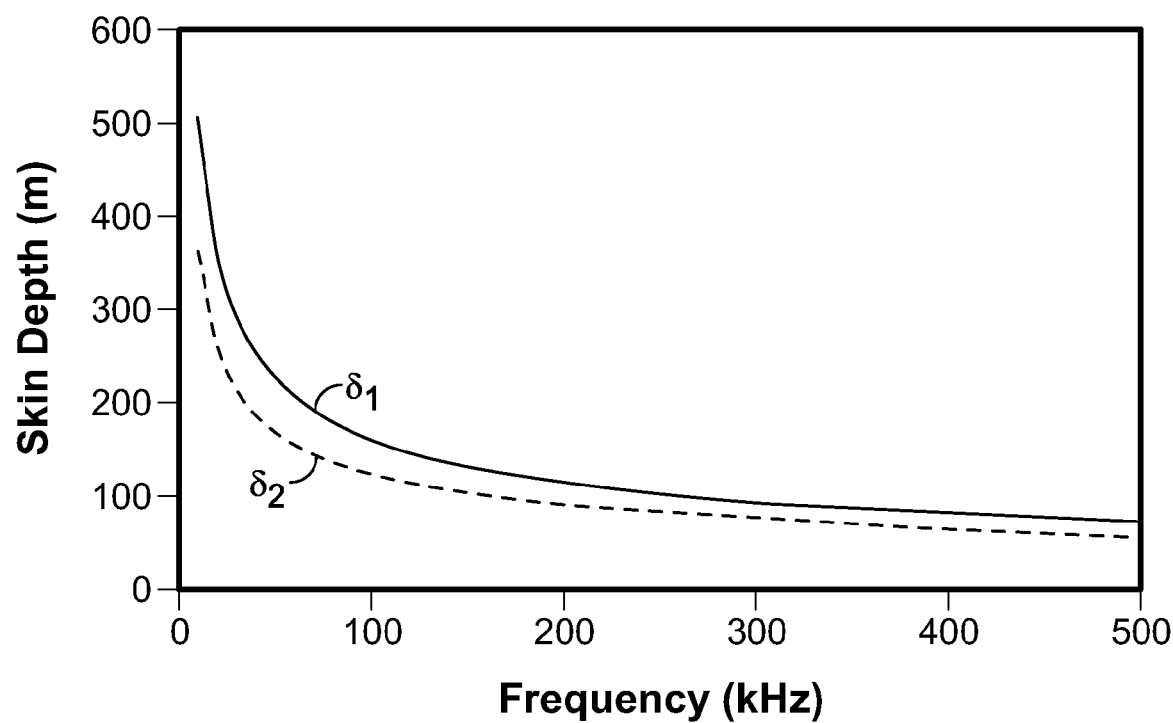
FIG. 7 is a graphic representation of the skin depth for EM waves in the 100 kHz range.

Referring next to FIG. 7, an exemplary embodiment illustrates the use of the method of identification and mapping of underground facilities with 100-500 kHz EM waves for ground penetrating applications to detect subterranean cavities comprised of air or metal. The graph of FIG. 7 shows the skin depth for EM waves in the 100 kHz range. In this range the skin depth is on the order of 100 m, sufficient to detect many objects of interest. The graph depicts skin depth versus frequency in the 100 kHz range for a terrain having $\sigma=1e-4$ S/m, $\epsilon=4.0$ and $\mu=1.0$. The curves $\delta_1$, $\delta_2$ are described by equations 2 and 3 as follows:

$$\delta_2 = c/\sqrt{2\pi\sigma\mu\omega}$$ [Equation 2]

$$\delta_2 = 1.41c/\sqrt{\mu\omega(4i\pi\sigma + \epsilon\omega)}$$ [Equation 3]

where $\delta_1$ takes into account only the earth's permeability and $\sigma$; and $\delta_2$ takes into account earth's permittivity, shell permeability and $\sigma$.

While the embodiments and results disclosed above are based on an exemplary 100 kHz signal, it should be understood that the method is applicable for a range of signals from 10-150 kHz for underground mapping and identification of subsurface features at a depth greater than one meter. In another embodiment the method is applicable for a range of signals from 10-100 kHz; and in yet another embodiment the applicable range of signals is from 10-500 kHz. In a preferred embodiment the method employs a radar signal of about 100 kHz.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the underground mapping and identification method as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of

What is claimed is:

1. A method of creating a map of voids in the ground based on reflected electromagnetic signal, comprising:
   traversing a metamaterial electrically small antenna receiver/probe in a near field above a target area;
   generating a signal from a signal transmitter located above the target area, the signal having a predetermined wavelength $\lambda$ of between 10 kHz to 500 kHz;
   receiving a reflected signal with the metamaterial electrically small antenna receiver/probe, the reflected signal including indications of subsurface variations via reflection of the generated signal; and
   detecting components of the reflected signal to provide a predetermined resolution.

2. The method of claim 1, wherein the predetermined wavelength is defined by a hypothetical underground facility, the underground facility having a dimension that is characterized by the following equation:

$\lambda/N$; wherein $N$ is at least 10.

3. The method of claim 1, wherein the step of traversing the metamaterial electrically small antenna receiver/probe in a near field above a target area includes traversing a path in a low altitude that follows a profile of the Earth's surface.

4. The method of claim 1, wherein the altitude of the path is in the range of thirty meters to fifty meters.

5. The method of claim 1, wherein the altitude of the path is in the range of ten meters to one kilometer.

6. The method of claim 1, wherein the signal transmitter is disposed in a far field.

7. The method of claim 1 wherein the signal transmitter in the far field includes an antenna having a length between about ½ and ¼ of the predetermined wavelength $\lambda$.

8. The method of claim 7, wherein an incident wave generated by the signal transmitter is substantially a plane wave.

9. The method of claim 1, wherein the transmitter includes an electrically-small antenna.

10. The method of claim 9, wherein the length of the electrically-small antenna being in the range of $\lambda/10$ to $\lambda/10,000$ of the predetermined wavelength $\lambda$.

11. The method of claim 9, wherein the transmitted signal is a generally conical beam.

12. The method of claim 9, wherein the capability of the metamaterial electrically small antenna receiver/probe to resolve objects compared to a wavelength of interrogation is a function of the fact that the transmitter transmits the signal in the near field of a source and an object.

13. The method of claim 1, wherein the signal transmitter and the metamaterial electrically small antenna receiver/probe are deployed on an aircraft that traverses the flight path in a near field, the flight path approximately conforming to the profile of a surface above a region of interest.

14. The method of claim 1, wherein the altitude of the flight path is approximately $\lambda/N$, wherein $\lambda$ is the wavelength and N is an integer value greater than 1.

15. A method of creating a map of voids in the ground based on a reflected electromagnetic signal, comprising:
   traversing in an aircraft having a metamaterial electrically small antenna receiver/probe and signal transmitter, in a near field above a target area;
   generating a signal from a signal transmitter located above the target area, the signal having a predetermined wavelength $\lambda$ of between 10 kHz to 500 kHz;
   receiving a reflected signal with the metamaterial electrically small antenna receiver/probe, the reflected signal including indications of subsurface variations via reflection of the generated signal; and
   detecting components of the reflected signal to provide a predetermined resolution.

16. The method of claim 15, wherein the predetermined wavelength is defined by a hypothetical underground facility, the underground facility having a dimension that is characterized by the following equation:

$\lambda/N$; wherein $N$ is at least 10.

17. The method of claim 15, wherein the step of traversing includes traversing a path in a low altitude that follows a profile of the Earth's surface.

18. The method of claim 15, wherein the metamaterial electrically small antenna receiver/probe be the altitude of the path is in the range of thirty meters to fifty meters.

19. The method of claim 15, wherein the transmitter includes an electrically-small antenna.

20. The method of claim 19, wherein the electrical length of the electrically-small antenna is in the range of $\lambda/10$ to $\lambda/10,000$ of the predetermined wavelength $\lambda$.

21. The method of claim 15, wherein the flight path approximately conforms to a profile of a surface above a region of interest.

22. The method of claim 15, wherein the altitude of the flight path is approximately between 10 meters and a kilometer.

* * * * *